United States Patent [19]
Levinsohn, deceased et al.

[11] 3,971,566
[45] July 27, 1976

[54] HYDRAULIC SEALING MEMBER AND PROCESS

[75] Inventors: Richard Levinsohn, deceased, late of Menlo Park, Calif.; Joseph Levinson, administrator-with-will-annexed, Los Angeles; James E. Jervis, Menlo Park, both of Calif.

[73] Assignee: Raychem Corporation, Menlo Park, Calif.

[22] Filed: Jan. 6, 1975

[21] Appl. No.: 538,740

Related U.S. Application Data

[60] Continuation-in-part of Ser. No. 239,395, March 29, 1972, abandoned, which is a division of Ser. No. 70,321, Sept. 8, 1970, Pat. No. 3,759,552.

[52] U.S. Cl. ............................ 277/206 R; 277/236; 277/1
[51] Int. Cl.² .......................................... F16J 15/08
[58] Field of Search ................. 277/26, 236 R, 206; 285/DIG. 17, DIG. 18

[56] References Cited
UNITED STATES PATENTS

| | | | |
|---|---|---|---|
| 3,007,721 | 11/1961 | Schmohl et al. | 277/236 X |
| 3,098,662 | 7/1963 | Iversen | 285/110 X |
| 3,174,851 | 3/1965 | Buehler et al. | 75/170 |
| 3,273,918 | 9/1966 | Legarra et al. | 285/112 X |
| 3,637,223 | 1/1972 | Weber | 277/236 |

FOREIGN PATENTS OR APPLICATIONS

| | | | |
|---|---|---|---|
| 683,333 | 2/1930 | France | 277/206 |

*Primary Examiner*—Samuel B. Rothberg
*Attorney, Agent, or Firm*—Lyon & Lyon

[57] ABSTRACT

Disclosed herein is a metallic V-ring sealing member capable of sealing hydraulic fluid against egress from a hydraulic system. The sealing member of the invention is fabricated from a metal capable of undergoing an austenitic to martensitic state change upon cooling below a transition temperature and of undergoing a further transformation from martensitic to austenitic state upon warming to a temperature of less than the operating temperature of the system. By the process of the invention, a hydraulic system may be sealed by cooling the sealing member of the invention below its transition temperature, placing the sealing member in sealing relationship to the parts of the system to be sealed and warming the sealing member to effect a transformation from its martensitic state to its austenitic state.

11 Claims, 8 Drawing Figures

HYDRAULIC SEALING MEMBER AND PROCESS

This application is a continuation-in-part of a co-pending application entitled METALLIC SEALING MEMBER, Ser. No. 239,395, filed Mar. 29, 1972, now abandoned, which in turn was a division of the then co-pending application entitled HYDRAULIC COUPLING WITH SEALING MEMBER, Ser. No. 70,321, filed Sept. 8, 1970, now U.S. Pat. No. 3,759,552, issued Sept. 8, 1973.

BACKGROUND OF THE INVENTION

This invention relates to the sealing of hydraulic systems against egress of the hydraulic fluid. The seal and method of the invention may be used to provide metal to metal seals on the internal portions of the hydraulic system or in sealing a hydraulic component to the hydraulic line. The hydraulic component may be a pump, compressor, hydraulic cylinder or the like.

Many hydraulic components are provided with a standard threaded female boss. Most connectors employed to connect the hydraulic component to the hydraulic line utilize some adaptor which screws into the threaded boss. It is necessary that a fluid-tight connection be made between the hydraulic component and its adaptor. A common prior art sealing method utilizes a rubber O-ring. However, the use of rubber or a similar polymeric material severly limits the adaptability of the system both as to temperature range and as to compatible hydraulic fluids.

In order to expand the operating conditions of a sealed hydraulic system, it has been proposed to employ a metallic V-ring seal to join metallic sections of fluid pressure systems. One such seal is described in U.S. Pat. No. 3,637,223. However, the use of such a seal creates problems in installation which may outweigh the benefits of a metal seal. In many applications it is desirable that the metallic components being sealed be mated by a screwing action. When such a mating relationship is employed with a conventional metallic seal, the tightening of the hydraulic components into sealing relationship results in the scratching or galling of the seal surface which in turn diminishes the integrity of the seal formed. For example, in the hydraulic coupling of U.S. Pat. No. 3,759,552, the parent of this application, a conventional metallic seal would prove unacceptable.

It is therefore desirable to provide a metallic sealing member suitable for use in hydraulic systems which will provide an acceptable metal to metal seal regardless of the manner in which the components of the hydraulic systems are mated in sealing configuration. In other applications, it is also desirable to provide a method of sealing hydraulic systems whereby the metallic sealing member may be deformed from its sealing configuration so as to be readily placed in the hydraulic system in sealing arrangement while returning to a tight sealing configuration at the operating conditions of the system.

The use of heat recoverable metals to form metal to metal couplings is disclosed in U.S. patent application Ser. No. 410,314, filed Oct. 29, 1973 as a continuation of Ser. No. 51,809, filed July 2, 1970 which in turn was a continuation-in-part of Ser. No. 852,722. That application was filed by J. D. Harrison and J. E. Jervis and is assigned to the assignee of the present invention, and the disclosure of that application is incorporated herein by reference. Heat recoverable alloys are disclosed in U.S. Pat. No. 3,753,700, issued Aug. 21, 1973 to J. D. Harrison et al. and assigned to the assignee of the present invention. The disclosure of that patent is incorporated herein by reference.

SUMMARY OF THE INVENTION

The metallic, hydraulic sealing member of the present invention provides a metal seal of great strength but yet one which will not scratch or gall the sealing surface of the hydraulic component or its own sealing surfaces during installation. This beneficial combination of properties is permitted by the use of a metal which can exhibit vastly different physical properties at different temperatures. As disclosed in the aforementioned U.S. Pat. No. 3,753,700 and in Chapter 22 of *Intermetallic Compounds*, edited by J. H. Westbrook (Wyly & Sons, 1967) certain alloys can be made to convert from a relatively strong austenitic state to a relatively weak martensitic state by reducing the temperature of the alloy below its transition temperature.

Alloys containing major proportions of titanium and nickel exhibit the ability to be transformed reversibly from an austenitic state to a martensitic state by temperature change. Small amounts of metals such as iron, aluminum or manganese may be incorporated with major amounts of titanium and nickel to result in an alloy with the desired transition temperature characteristics. By way of example, the following alloys (in atomic percents) have transition temperatures above −196°C and below −75°C.

| Titanium | 50 | Nickel | 47 | Iron | 3 |
| Titanium | 49 | Nickel | 50 | Aluminum | 1 |
| Titanium | 50 | Nickel | 48 | Manganese | 2 |

The alloy preferably should have transition temperatures above −196°C since then it can be converted to a martensitic state by immersing it in readily available liquid nitrogen. Due to a relatively small hysterisis effect, the change of state from austenitic to martensitic state and back again may occur at somewhat different temperatures. However the metal of the invention is required to both undergo a reversible change of state and to undergo the austenitic to martensitic to austenitic changes below the design operating temperature of the system.

The change of state from martensitic to austenitic can also be made to result in heat recoverability by the addition of stresses to the alloy, particularly when it is in its martensitic state. This is described in the aforementioned application, Ser. No. 410,314. Other heat recoverable metals suitable for use in the invention herein are disclosed in U.S. Pat. Nos. 3,012,882 and 3,174,851 and Belgian Pat. No. 703,649, the disclosures of which are incorporated by reference herein.

Thus, to form a strong, galling resistant seal by the process of the invention, the metal seal fabricated from the specified metals is cooled to below its austenitic to martensitic transition temperature. The seal is then placed in sealing relationship to the parts to be sealed. For example, the adaptor may be screwed into the hydraulic component. The seal is then allowed to warm above its martensitic to austenitic transition temperature at which time it converts from its weak martensitic state to its strong austenitic state. By screwing the adaptor into the hydraulic component and therefore against the seal surface while the seal is in its weaker martensitic state galling and scratching are substantially reduced. For best results, the adaptor is also cooled to the temperature of the seal before installation.

The alloy from which the seal is made should have its martensitic to austenitic transition temperature below the operating temperature of the hydraulic equipment so that the seal is in its austenitic state during operation. Preferably, the sealing member of the invention is fabricated from a metal having its austenitic to martensitic and its martensitic to austenitic transition temperatures below about −60°C and the sealing member should remain in its austenitic state in the temperature range of from about −54°C to about 232°C.

Where the metallic sealing member is also heat recoverable, the heat recoverability may be utilized to cause a change in shape of the seal as it is warmed above its martensitic to austenitic transition temperature. Thus, the seal, in its martensitic state, may be deformed so as to fit over an enlarged area of the hydraulic adaptor and when warmed to its austenitic state, will revert to its original configuration and become captive. Additionally, the seal may become captive by engagement along its outer surface.

The second sealing point of the coupling described in U.S. Pat. No. 3,759,552 exists between the adaptor and the hydraulic line. This second seal also utilizes a heat recoverable metal but for a different reason. A heat recoverable sleeve is first affixed to the hydraulic line. This may be done by several methods including shrinking the sleeve over the hydraulic line in a manner described in application Ser. No. 410,314. This sleeve is provided with a circular mating surface corresponding to a mating surface on the adaptor. Either one or both of these mating surfaces is undercut to permit some movement of this mating surface along the direction of the axis of the coupling. Means are provided to tighten and hold the sleeve against the adaptor.

The resulting coupling is a removable all-metal coupling useful over a wide temperature range and unaffected by solvating properties of the hydraulic fluid. Also, the hydraulic component is not scratched by the installation of the adaptor and yet a seal of great strength results.

DESCRIPTION OF THE PREFERRED EMBODIMENTS

Figure 1:
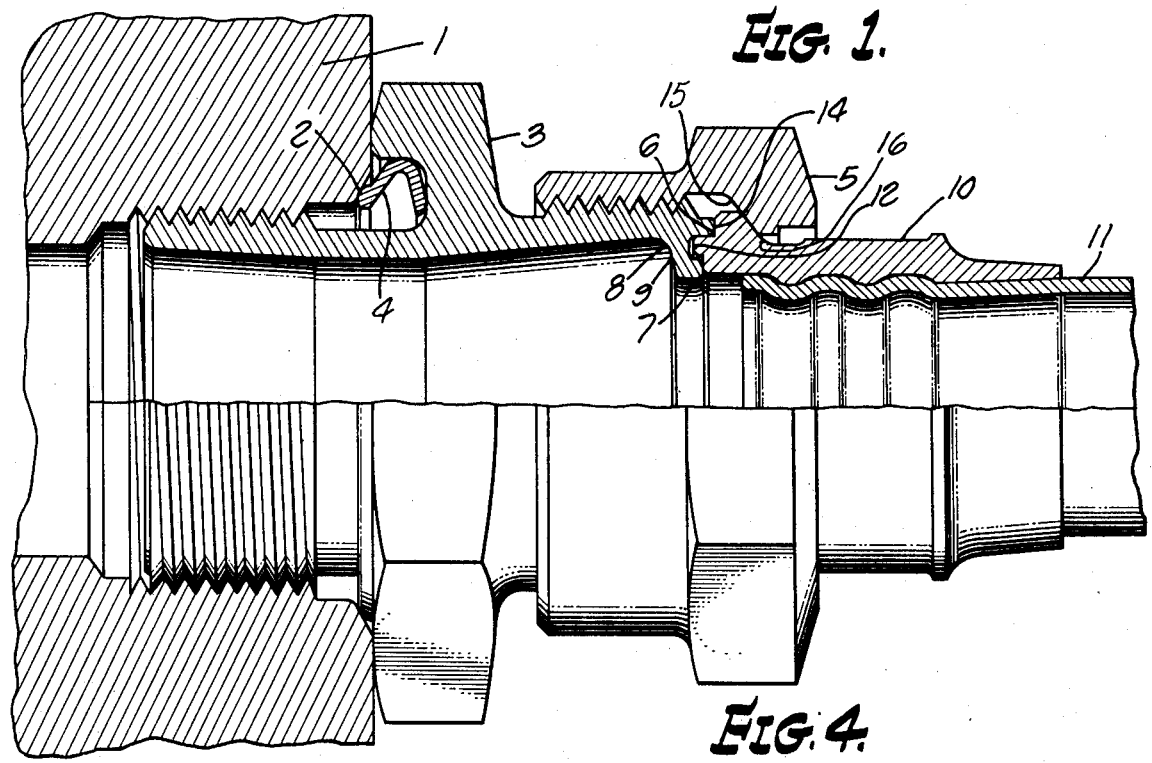
FIG. 1 is a plan view partly in section of a preferred coupling of the invention employing the sealing member of the invention.

Turning now to FIG. 1, a threaded hole or boss is provided in hydraulic component 1 which is provided with a mating suface 2 at the outer edge of the hole. An adaptor 3 is shown screwed into the boss in hydraulic component 1. A heat recoverable, metallic V-ring seal 4 is shown in a recess of adaptor 3 and mates both with the adaptor and mating surface 2 thereby preventing fluid leakage between the hydraulic component and the adaptor. The adaptor is threaded at one end to fit the threaded hole in the hydraulic component. The outside diameter of the adaptor is also threaded at its other end to permit the attachment of coupling nut 5 thereon. The adaptor 3 has an intermediate hexagonal wrench flat which facilitates tightening of the adaptor into the threaded hole. The recess is located beneath this wrench flat. Adaptor 3 has an outer circular projecting ring 6 which serves to protect circular mating surface 7. Recessed area 8 has been formed behind circular mating surface 7 to permit some movement of the mating surface as described below. This movement provides an initial sealing pressure.

Heat recoverable sleeve 10 has been securely shrunk about hydraulic line 11 by the manner described in application, Ser. No. 410,314 described above. Heat recoverable sleeve 10 has a projecting ring 12 which provides scuff protection for the circular mating surface 13 on the heat recoverable sleeve and also helps to align the adaptor with the sleeve prior to tightening. The sleeve 10 also has a recessed portion 14 which provides a stop for outer circular projecting ring 6 of the adaptor. The shoulder 15 of coupling nut 5 pushes against the shoulder 16 of the heat recoverable sleeve 10 to cause the sleeve to be brought against the adaptor 3 when the coupling nut is screwed on the adaptor. The operation of the seal between mating sufaces 7 and 13 is more clearly shown in FIGS. 4 and 5 where adaptor 3 and sleeve 10 are shown prior to tightening in FIG. 4 and after tightening in FIG. 5. The circular mating surface 7 of the adaptor contacts mating surface 13 of the sleeve before outer circular projecting ring 6 of the adaptor has touched the recessed portion 14 of the sleeve 10. As the sleeve 10 is forced toward adaptor 3 by coupling nut 5, the mating surface 7 of the adaptor moves toward the hydraulic component in a direction generally parallel to the axis of the coupling. This results from the provision of recessed area 8 which forms an inwardly extending arm 9 between the circular mating surface 7 and the main body of the adaptor. The result is an action like a belleville spring which maintains a steady force between mating surfaces 7 and 13 thereby forming an excellent seal. The pressure of the hydraulic fluid on the recessed area 8 supplements this force and forms a dynamic seal between these mating surfaces.

Figures 2, 4:
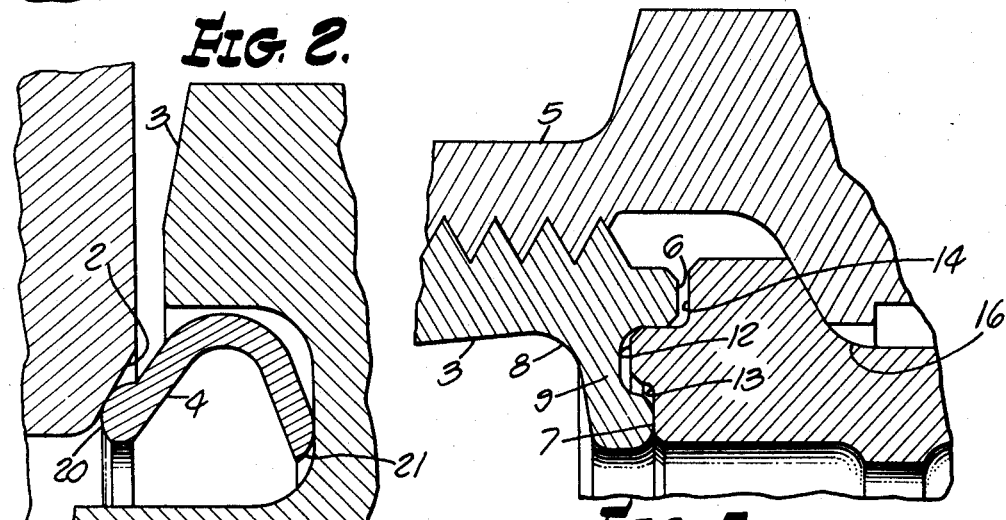
FIG. 2 is an enlarged fragmentary view of a heat recoverable, metallic seal of the invention shown prior to final engagement.
FIG. 4 is an enlarged fragmentary view of the heat recoverable sleeve end portion of FIG. 1 shown prior to final engagement.
Figures 3, 5:
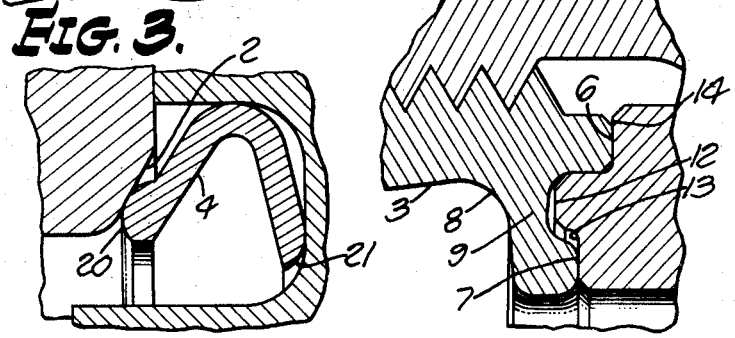
FIG. 3 is an enlarged fragmentary view of a heat recoverable, metallic seal of the invention shown after final engagement.
FIG. 5 is an enlarged fragmentary view of the heat recoverable sleeve end portion of FIG. 1 shown after final engagement.
Figure 8:
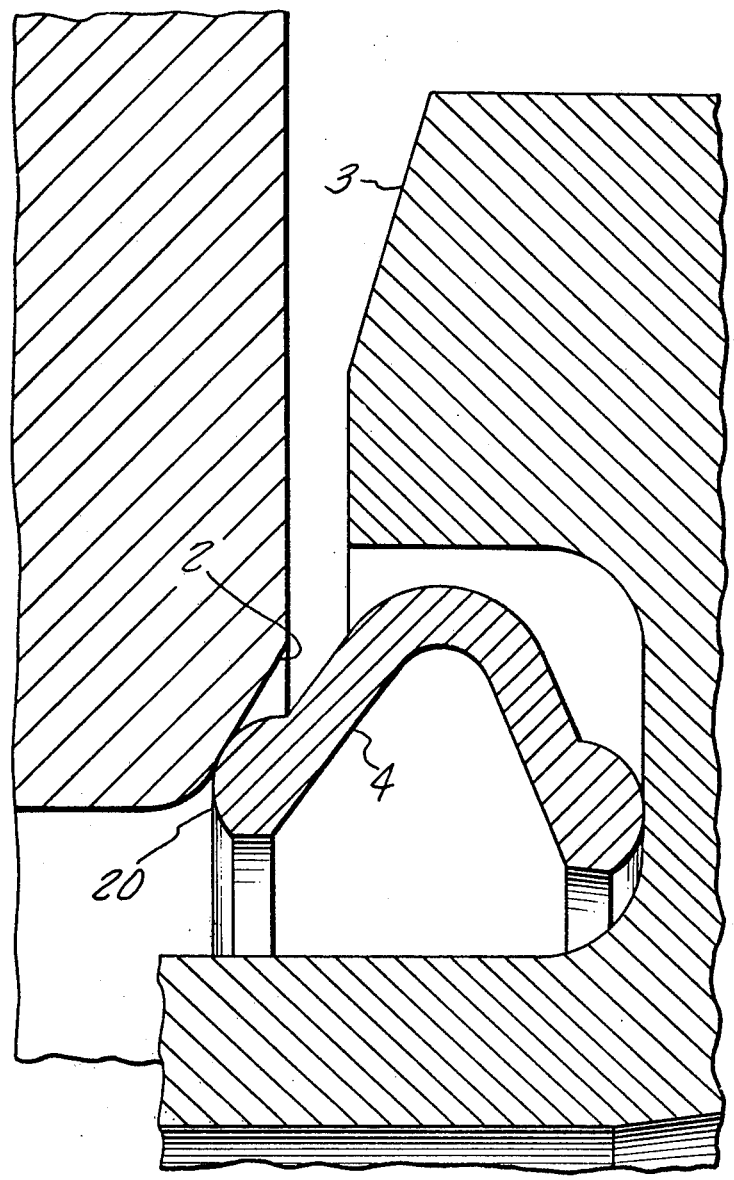
FIG. 8 is an enlarged fragmentary view of the seal of FIG. 2 showing a heat recoverable seal having a bead at each end thereof.

Turning now to FIGS. 2 and 3, metallic, heat recoverable V-ring seal 4 is shown in enlarged cross section in a recessed portion of adaptor 3. In FIG. 2, the seal is shown prior to tightening and in FIG. 3 after tightening. A bead 20 having a generally semi-circular outer surface is provided at the end of one side of the V-ring which contacts mating surface 2 of the hydraulic component. An arcuate surface 21 is provided at the end of the outer side of heat recoverable seal 4 which contacts adaptor 3. The shape of seal 4 is such that hydraulic pressure within the coupling tends to expand the seal against the hydraulic component and the adaptor at points 20 and 21. If desired, a bead or arcuate surface may be provided on each of the sides of the sealing ring thus preventing any accidental reverse positioning of the ring, as shown in FIG. 8.

Figure 6:
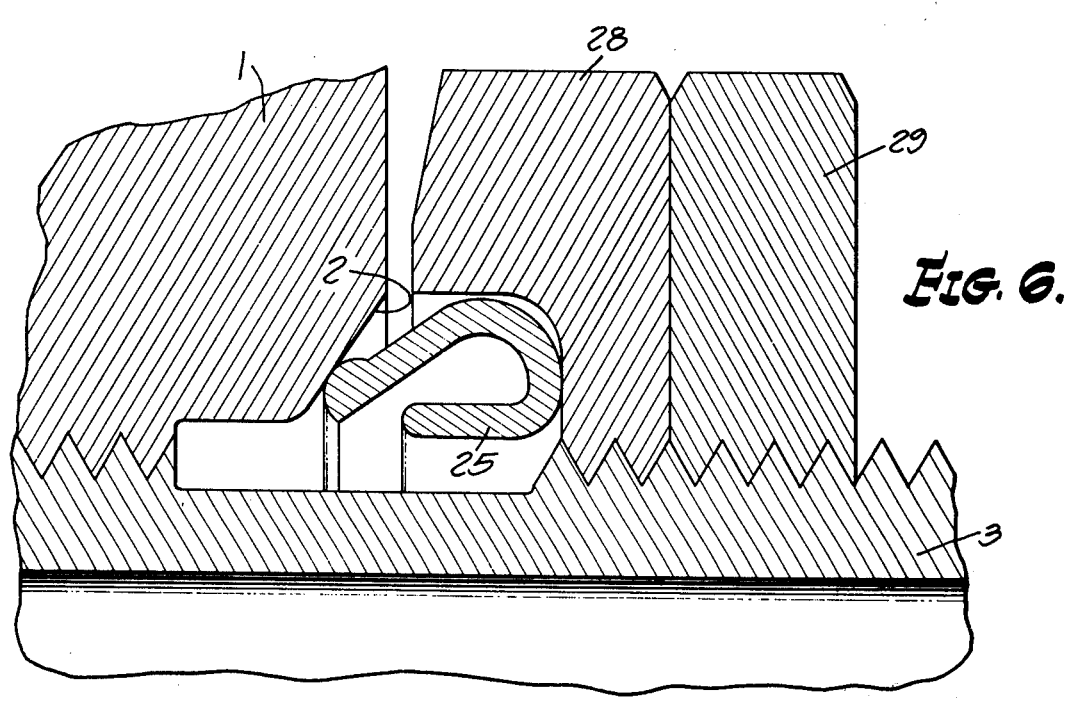
FIG. 6 is an enlarged cross sectional view of an alternatively configured, heat recoverable, metallic seal of the invention prior to heat recovery.
Figure 7:
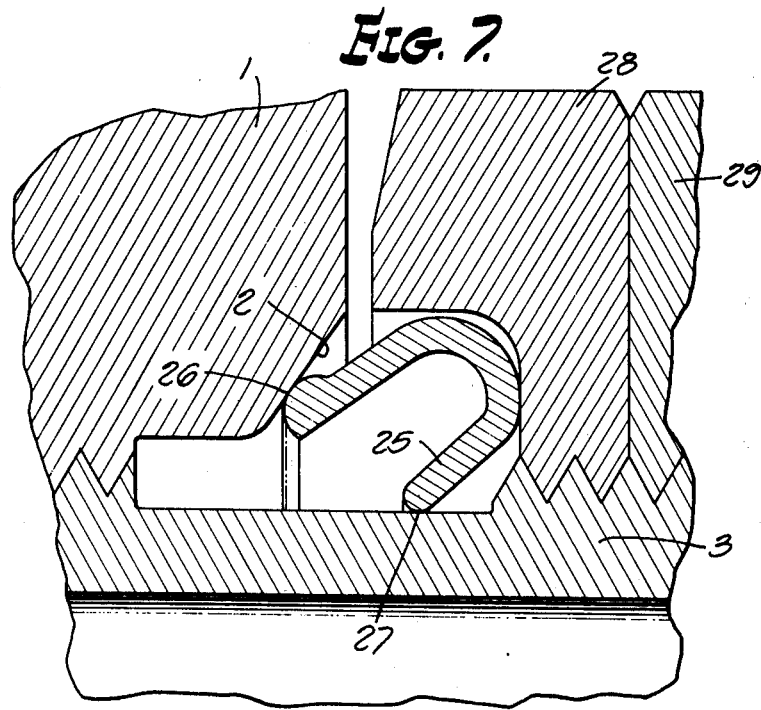
FIG. 7 is an enlarged cross sectional view of a heat recoverable, metallic seal of the invention after heat recovery.

Turning now to FIGS. 6 and 7, there is shown an alternative configuration of the heat recoverable seal.

In FIG. 7, heat recoverable seal 25 is shown in its sealing position having mating areas at 26 and 27. The hydraulic pressure tends to increase the seal at these areas. Since, in this configuration, the seal has a mating area 27 on an outer surface of the adaptor 3, it is less dependent upon the position of the tightening surface which is shown in FIGS. 6 and 7 as tightening nut 28. Thus, a fluid tight seal results even though the tightening surface is not threaded fully against the hydraulic component.

The seal 25 is shown in FIG. 6 in its martensitic state having been deformed according to the process of the invention which enables it to be placed over the threads of the adaptor 3. When the seal is warmed above its transition temperature, it reverts to its stronger austenitic state and to its original undeformed configuration as shown in FIG. 7. This has the further advantage of capturing the seal. In order to hold tightening nut 28 in place, a lock nut 29 is also threaded over adaptor 3.

The alloy chosen for the seal should have a martensitic to austenitic transition temperature such that it exists in its strong austenitic state in the operating temperature range of the hydraulic system in which it is used. This heat recoverable seal should also be capable of being cooled to below its austenitic to martensitic transition temperature for installation of the adaptor into the hydraulic component. In this way, damage to the mating surface of the boss can be minimized. As described in aforementioned application to Harrison and Jervis, Ser. No. 410,314, this may be a very low temperature in that the adaptor may be cooled in a fluid such as liquid nitrogen just prior to connection with the hydraulic component. As discussed above, the preferable operating temperature of the hydraulic system is from about −54°C to about 232°C. This temperature range in turn defines the transition temperature range of metals from which sealing members of the invention may be fabricated.

The sleeve is normally connected to the adaptor after the adaptor has been connected to the hydraulic component. The means for holding the sleeve against the adaptor need not utilize a coupling nut but instead could use a circumferential clamp, a threaded union, or the like. The projecting ring on the adaptor and that on the sleeve are not essential to the operation of the coupling but are advantageous to prevent the mating surfaces from becoming marred or scuffed. While the recessed area and inwardly extending area shown in the drawings as a portion of the adaptor, it could equally well be provided in the heat recoverable sleeve. It is only necessary that a belleville spring type of action exist between the mating surface of the adaptor and that of the sleeve.

It is not necessary that the heat recoverable sleeve be fabricated from the same alloy as the heat recoverable seal. Its transition temperature, however, should be such that it also exists in its stronger austenitic state at the temperatures at which it will operate.

The particular curvature of the heat recoverable seal shown in the drawing may be varied to a more U-shaped or a more V-shaped configuration as long as the fluid pressure will tend to expand the seal against its two mating surfaces. The hydraulic component need not be a piece of equipment having a threaded hole, but could be a second section of hydraulic tubing thus constituting a union between hydraulic lines. While certain embodiments of the invention are described, the invention may be embodied in other specific forms not departing from the spirit or central characteristics thereof. The present embodiments are therefore to be considered in all respects as illustrative and not restrictive.

We claim:

1. A metallic V-ring sealing member capable of sealing hydraulic fluid against egress from a hydraulic system having an operating temperature range within the range of from about −54°C to about 232°C, said sealing member being formed from a metal alloy which (a) undergoes transition from an austenitic state to a martensitic state when cooled below a transition temperature, said temperature being below about −60°C (b) undergoes a further transition from the martensitic to the austenitic state upon warming from below said temperature to a temperature less than the operating temperature of said system, (c) remains in the austenitic state within the operating temperature range, and (d) is weaker in its martensitic state than in its austenitic state whereby a seal may be formed between a sealing surface of the sealing member and a sealing surface of the hydraulic system with substantially no galling or scratching of either sealing surface.

2. The member of claim 1 wherein the member is provided with an arcuate surface at one end of the V and a bead at the other end thereof.

3. The member of claim 1 wherein the member is provided with an arcuate surface and a bead at each end of the V.

4. The member of claim 1 wherein said V-ring has at least one semi-circular sealing surface.

5. The member of claim 4 wherein said V-ring is symmetrical.

6. A metallic V-ring sealing member capable of sealing hydraulic fluid against egress from a hydraulic system having an operating temperature range within the range of from about −54°C to about 232°C, said sealing member being formed from a metal alloy whch (a) undergoes transition from an austenitic state to a martensitic state when cooled below a transition temperature, said temperature being below about 60°C (b) undergoes a further transition from the martensitic to the austenitic state upon warming from below said temperature to a temperature less than the operating temperature of said system, (c) remains in the austenitic state within the operating temperature range, and (d) is weaker in its martensitic state than in its austenitic state whereby a seal may be formed between a sealing surface of the sealing member and a sealing surface of the hydraulic system with substantially no galling or scratching of either sealing surface.

7. The member of claim 6 wherein said alloy further contains a minor proportion of a metal selected from the group consisting of iron aluminum and manganese.

8. The member of claim 6 wherein the member is provided with an arcuate surface at one end of the V and a bead at the other end thereof.

9. The member of claim 6 wherein the member is provided with an arcuate surface and a bead at each end of the V.

10. The member of claim 6 wherein said V-ring has at least one semi-circular sealing surface.

11. The member of claim 10 wherein said V-ring is symmetrical.

* * * * *